United States Patent
Hart et al.

[19]

[11] Patent Number: 6,027,134
[45] Date of Patent: *Feb. 22, 2000

[54] REMOVABLE TRAILER TONGUE

[75] Inventors: Stephen P. Hart, Atlanta; Paul U. Powell, Norcross, both of Ga.

[73] Assignee: American Signal Company, Atlanta, Ga.

[*] Notice: This patent issued on a continued prosecution application filed under 37 CFR 1.53(d), and is subject to the twenty year patent term provisions of 35 U.S.C. 154(a)(2).

[21] Appl. No.: 08/753,191

[22] Filed: Nov. 21, 1996

[51] Int. Cl.$^7$ ....................................................... B60T 7/20
[52] U.S. Cl. ................................... 280/491.2; 188/112 R; 188/142
[58] Field of Search ........................... 280/491.2, 491.5, 280/414.1; 188/112 R, 345

[56] References Cited

U.S. PATENT DOCUMENTS

| | | | |
|---|---|---|---|
| 3,880,263 | 4/1975 | Ewald et al. | 188/112 R |
| 3,881,577 | 5/1975 | Wherry et al. | 188/112 |
| 4,331,346 | 5/1982 | Walters | 280/414.1 |
| 4,333,665 | 6/1982 | Haddock | 280/408 |
| 4,697,819 | 10/1987 | Cascone | 280/491 |
| 5,485,900 | 1/1996 | Denny | 188/112 |

*Primary Examiner*—Lanna Mai
*Assistant Examiner*—Andrew J. Fischer
*Attorney, Agent, or Firm*—Bernstein & Associates, P.C.

[57] ABSTRACT

A removable trailer tongue for use with a towing vehicle and a trailer frame equipped with hydraulic brakes. The trailer tongue (10) can be removed without disconnecting any of the components of the hydraulic system. A first guide (20) and a second guide (22) slidingly receive a tongue (10). A first end (12) of the tongue (10) is equipped with a non-active hitch (18) that connects to the towing vehicle. The second end (14) of the tongue (10) has an aperture (38) defined therein. A brake assembly (24) attaches adjacent to or on the second guide (22), and the assembly (24) has an aperture (36) defined therein. The tongue (10) is inserted through the guides (20, 22) until the aperture (38) aligns with the aperture (36) in the brake assembly (24). In order to connect the tongue (10) to the trailer frame (16), a pin (40) is inserted through the apertures (36, 38) in the brake assembly (24) and the tongue (10). In order to remove the tongue (10), the pin (40) is removed and the tongue (10) slides out of the guides (20, 22).

16 Claims, 2 Drawing Sheets

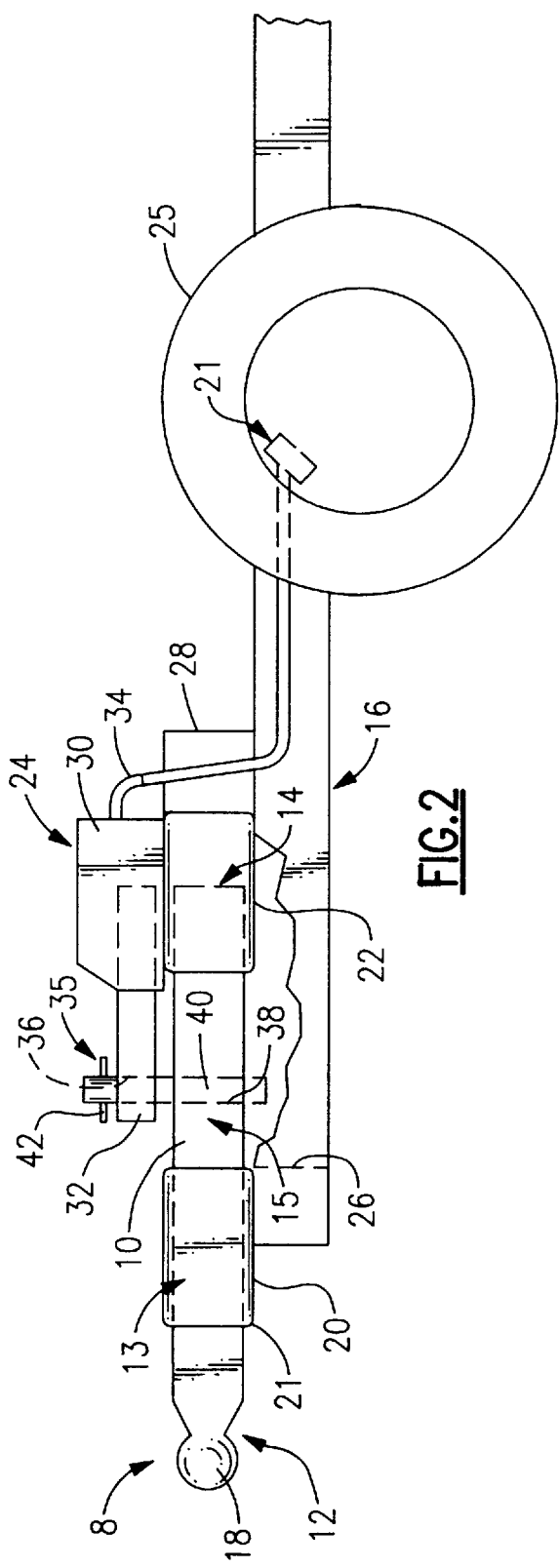
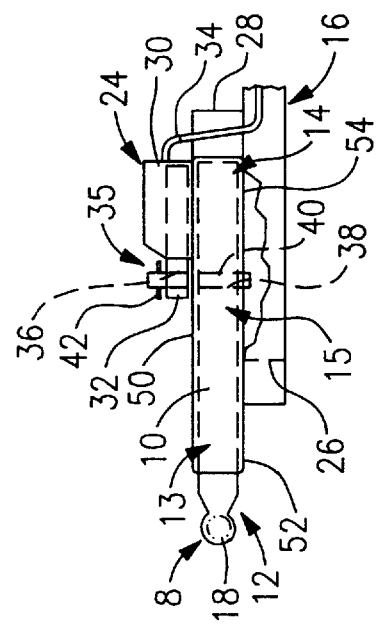
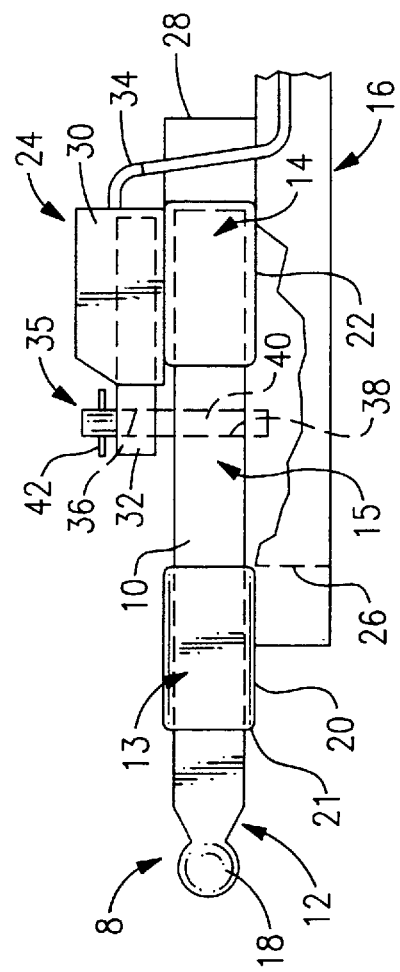

REMOVABLE TRAILER TONGUE

FIELD OF THE INVENTION

The present invention relates to trailers of the type commonly pulled by motorized vehicles, and, more particularly, to a removable trailer tongue for such a trailer.

BACKGROUND OF THE INVENTION

It is often desirable to tow a trailer behind a vehicle to transport goods or equipment, such as hauling boats from a dry storage area to a body of water. It can be more cost effective to purchase a trailer and to transport the boat from dry storage than to pay to store the boat at a marina or other facility by the water. Trailers and trailer frames are also prevalent in the lawn care industry and other areas where there is a great deal of equipment to be moved from site to site. Another instance where trailers are useful is for transporting highway message signs. Advances in the art have enabled portable highway message signs to display infinite numbers of messages and to have stand alone generators for recharging their batteries. These signs are used to alert drivers of traffic conditions, construction sites, and other important road conditions. The location of these signs often varies, and, therefore, portability is an important feature of any sign designed for roadway use. Accordingly, portable highway message signs are usually built with integral trailer frames that allow a vehicle to move the signs between different locations. As long as the size and weight of the material to be transported is not excessive, a trailer is an economical method of increasing cargo capacity. The alternative to adding trailers is to buy trucks with larger payloads, which can be costly.

Two or four wheel trailers constructed for any of the uses described above are usually equipped with brakes for safety purposes. Brakes are often necessary because under normal conditions when the brakes are applied on the towing vehicle, the forward inertia of the trailer adds substantially to the load on the vehicle brakes and may cause the driver to lose control of the towing vehicle or the trailer. A solution to this problem is to provide the trailer with its own set of hydraulic brakes that sense and respond when the brakes are applied to the towing vehicle.

A typical hydraulic brake system consists of a brake actuator assembly having a master cylinder assembly with a master cylinder in a housing and having a linkage connected to the master cylinder, some type of mechanical brakes such as friction brakes located at the wheels to apply the braking force, and hydraulic lines connected between the master cylinder and the mechanical brakes. Movement of the linkage causes a compression stroke in the master cylinder which creates pressure in the hydraulic lines that activates the brakes located at the wheels. Typically, the forward inertia of the trailer toward the towing vehicle causes the brakes on the trailer to be applied in proportion to the manner that the brakes are applied on the towing vehicle. If the towing vehicle is subject to hard braking, the trailer will be subject to hard braking.

On trailers that are provided with a hydraulic brake system, it is often desirable to have a trailer tongue that is removable. The trailer tongue is that portion of a trailer frame that extends toward the towing vehicle and is equipped with a mechanical device suitable for attaching with a towing appendage, such as a ball hitch on the towing vehicle. It is desirable to have a removable trailer tongue for many reasons. First, a removable trailer tongue can reduce the profile of the trailer to lower shipping costs. Second, a removable trailer tongue can help prevent theft of unattended trailers that may have valuable items attached thereto.

In most commonly used hydraulic brake actuator assemblies such as the Demco Model DA66 (available from Dethmers Manufacturing Co., Boyden, Iowa), the linkage also functions as the trailer tongue. The two portions of the brake actuator assembly, the master cylinder assembly and the linkage/tongue, move relative to one another depending on the force of the trailer against the towing vehicle. When the brakes are applied to the towing vehicle, the trailer applies a forward inertial force to the linkage/tongue which causes the two parts of the actuator assembly to move relative to one another to generate hydraulic pressure to the brakes in the trailer wheel assemblies.

In a typical trailer equipped with a hydraulic brake system, the master cylinder assembly is fixedly attached to the trailer and the linkage/tongue has a hitch that connects with the towing vehicle. Accordingly, in order to separate the linkage/tongue from the rest of the trailer, the hydraulic lines have to be disconnected and the master cylinder assembly has to be removed from the trailer tongue. The time and effort involved in removing the master cylinder assembly and in reinstalling it make this undesirable. It is known in the art to connect the hydraulic lines with quick connect couplings in order to easily connect and disconnect the hydraulic lines. The drawback to these devices is that while the quick couplings can be made to prevent fluid from exiting the system, they cannot be made to completely prevent air from entering the system. Accordingly, the hydraulic system must be bled after reconnecting the hydraulic lines in order to assure that no air has entered the hydraulic lines. The introduction of air into the hydraulic lines can create "mushy" brakes or a brake failure which could lead to loss of control of the towing vehicle.

What is needed is a removable trailer tongue, for use with a hydraulic braking system, that does not require disconnection of the hydraulic system or any of its components in order to remove the trailer tongue from the rest of the trailer.

SUMMARY OF THE INVENTION

The present invention solves the above described problems by providing a removable trailer tongue that can be removed from the trailer frame without disconnecting any of the components of the hydraulic system.

Generally described, the present invention provides a removable trailer tongue for use with a towing vehicle and a trailer frame. In a preferred embodiment, the removable trailer tongue comprises a set of guides that are attached to the trailer frame. A tongue having a first end and a second end is designed to slidingly engage with the guides and has an aperture defined therein located at a position near the second end of the tongue. The tongue has a hitch such as a ball-receiving hitch located at the first end. A brake actuator assembly having a stationary master cylinder assembly and a moving linkage is connected to the trailer frame on or near the guide at the second end of the tongue. The linkage has an aperture defined therein, the tongue has an aperture defined therein, and a pin connects the linkage to the tongue, the apertures and the pin comprising a detachable coupling. When engaged, the pin extends through the aperture in the linkage and the aperture in the tongue to connect the brake actuator assembly to the towing vehicle. When the pin is removed, the tongue is able to slide away from the guides and can be retracted from the trailer frame without disconnecting any of the components of the hydraulic system.

In a second embodiment of the present invention, the guides are replaced with a single guide having an aperture defined therein. The aperture is sized to accept the pin which extends through the linkage, the guide, and the tongue. The single guide adds greater strength to the removable tongue assembly.

Accordingly, it is an object of the present invention to provide a removable trailer tongue that can be removed from a trailer with a hydraulic brake system without disconnecting any components of the hydraulic system.

It is a further object of the present invention to provide a trailer tongue that is removable so that the goods attached to the trailer cannot be easily towed away when the trailer is unattended.

It is still another object to provide a removable trailer tongue that can be removed for shipping purposes to reduce the profile of the trailer to lower the costs associated with shipping the device.

It is yet a further object of the present invention to provide a removable trailer tongue that eliminates the need to bleed the hydraulic lines after removing and then reinstalling the trailer tongue.

It is another object of the present invention to provide a removable trailer tongue that comprises a sliding tongue with a non-active hitch that connects to the brake actuator assembly on the trailer frame by means of a pin.

Other objects, features, and advantages of the present invention will become apparent upon reading the following detailed description of embodiments of the invention, when taken in conjunction with the accompanying drawings and the appended claims.

BRIEF DESCRIPTION OF THE DRAWINGS

The invention is illustrated in the drawings in which like reference characters designate the same or similar parts throughout the figures of which:

FIG. 2 is a side elevation detail view of the removable trailer tongue mounted on a trailer frame;

FIG. 3 is a side elevation detail view of the removable trailer tongue mounted on a trailer frame; and FIG. 4 is a side elevation detail view of a removable trailer tongue mounted on a trailer frame of a second preferred embodiment of the present invention.

DESCRIPTION OF THE PREFERRED EMBODIMENTS

Figure 1:
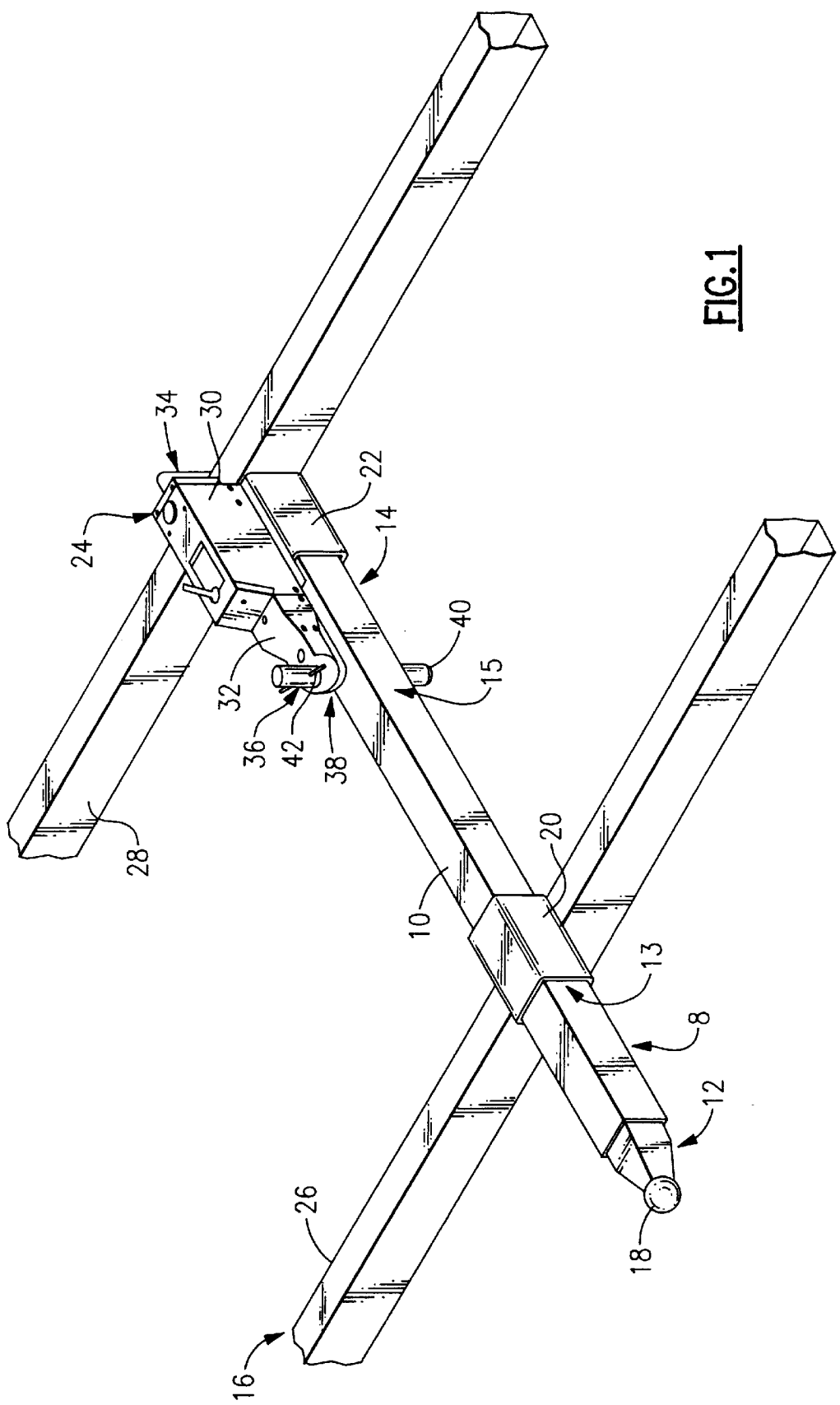
FIG. 1 is a perspective view of a removable trailer tongue of a first preferred embodiment of the present invention.

Referring now in more detail to the drawings, FIGS. 1–3 show a removable trailer tongue apparatus 8 comprising a tongue 10 having a first end 12, a second end 14, a first intermediate portion 13, and a second intermediate portion 15, adapted to removably engage with a trailer frame 16. The tongue 10 has a hitch 18 such as a non-active hitch located at the first end 12. However, any standard hitch arrangement can be used with the present invention including, but not limited to, a lunette eye, trunnion or the like. The tongue 10 preferably slides through a first guide 20 and a second guide 22 and attaches to a brake actuator assembly 24. The tongue first intermediate portion 13 is supported by the first guide 20 and the tongue second end 14 is supported by the second guide 22, such that the tongue first end 12 extends from a first end 21 of the first guide 20.

The tongue 10 is preferably constructed of metal tubing that is rectangular or square in cross-section. It is understood by those skilled in the art that the material of construction, the size, and the cross-sectional shape of the tongue 10 will depend on the size of the load, the speed of the towing vehicle, and other factors. The material of construction for the tubing is preferably mild steel, however, it is possible that other materials and even possibly non-metallic composites could be used. The shape for the cross section of the tubing could comprise an I, H, T, O, V, T, or X-shape or the like.

The first guide 20 and the second guide 22 are preferably hollow and sized to slidably receive the tongue 10. The first guide 20 and the second guide 22 are preferably constructed of relatively short sections of metal tubing that are fixedly attached to the trailer frame 16 such as by welding or by attaching with mechanical fasteners such as bolts, rivets or the like. For ease of manufacture, the two guides 20 and 22 are preferably made into two separate relatively short pieces. In cross-section, the guides 20 and 22 have inner dimensions that are slightly larger than the outer dimensions of the tongue 10. Accordingly, the tongue 10 telescopically engages and slides inside the guides 20 and 22 when it is being inserted or removed from the trailer frame 16 and to some extent during towing operations (as shown by the different positions of the tongue in FIGS. 2 and 3). Accordingly, it is to be understood by those skilled in the art that a material such as steel is preferred for construction of the guides 20 and 22. Guides 20 and 22 support the weight of the tongue 10 and withstand the sliding friction that occurs during insertion of the tongue 10, removal of the tongue 10, and to some extent during towing operations. It is to be understood by those skilled in the art that first guide 20 and second guide 22 may take forms other than that of hollow tubing, such as rails (not shown) over which the tongue 10 slides.

Preferably, the guides 20 and 22 are fixedly attached to a first cross member 26 and a second cross member 28 of the trailer frame 16 by welding, bolting, or by other methods of attaching metal to metal that are known to those skilled in the art. It is to be understood by those skilled in the art that the positioning of the guides 20 and 22 on the trailer frame 16 will depend on the size and shape of the trailer frame 16. As shown in the preferred embodiment in FIGS. 1–3, for example, cross members 26 and 28 provide a suitable attachment point for the guides 20 and 22, where the first cross member 26 is arranged in a subjacent position (lower but not beneath) relative to the second cross member 28.

The second guide 22, in addition to providing a sliding guide for the tongue 10, also supports the brake actuator assembly 24. Alternatively, the brake actuator assembly 24 may be supported from the trailer frame 16.

It is known in the art to provide a hydraulic brake system for a trailer 16 with two or more wheels 25 that is being pulled by a towing vehicle (not shown). When the brakes are applied on the towing vehicle, the forward inertia of the trailer frame 16 toward the towing vehicle causes the brake actuator assembly 24 to apply mechanical brakes 27 such as friction brakes to the trailer wheels 25. The force of the brakes 27 on the trailer wheels 25 is proportional to the amount of forward inertial force of the trailer frame 16 against the towing vehicle.

The preferred brake actuator assembly 24 for the present invention is a hydraulic surge type, namely the Demco Model DA66, commercially available through Dethmers Manufacturing Company in Boyden, Iowa. However, it is to be understood by those skilled in the art that the present invention would apply equally to any suitable brake actuator assembly 24 that attaches directly or indirectly to the towing vehicle and measures the forward inertial force between the trailer frame 16 and the towing vehicle to actuate the brakes 27 on the trailer wheels 25.

The brake actuator assembly 24 has a stationary master cylinder assembly 30 that is mounted to the guide 22 and a moving linkage 32 that actuates the master cylinder assembly 30 depending on the load applied to it. The mounting of the master cylinder assembly 30 may be reinforced from the trailer frame 16 or the brake actuator assembly 24 can be mounted directly to the trailer frame 16. The moving linkage 32 travels a certain distance relative to the master cylinder assembly 30 and in response to the sliding movement of the tongue 10 relative to the guides 20 and 22, depending on the force of the forward inertia of the trailer frame 16 against the towing vehicle. As shown in FIG. 3 relative to FIG. 2, when the towing vehicle decelerates, the force of the trailer frame 16 against the towing vehicle causes the tongue 10 and linkage 32 to move (distance shown is not to scale) toward the brake actuator 24, so that the force is transmitted through the master cylinder assembly 30 by a piston (not shown) in a master cylinder (not shown) housed therein. The piston compresses the fluid in the cylinder which creates pressure that causes hydraulic fluid to exit the cylinder through hydraulic fluid lines 34 and to activate the brakes 27 located at the wheels 25 of the trailer 16. The system is self-adjusting as the brakes 27 will not be applied once the forward inertial force of the trailer frame 16 against the towing vehicle is removed due to the braking force on the trailer wheels 25.

The second intermediate portion 13 of the tongue 10 removably attaches to the linkage 32 by a detachable coupling 35 in a position between the first and second guides such that the tongue is supported on both sides of the coupling 35 such that the tongue first end 12, the tongue first intermediate portion 13, and the tongue second intermediate portion 15 are all positioned forward (toward the towing vehicle) of the master cylinder assembly 30 on the trailer frame 16 or second guide 22. The detachable coupling 35 is preferably provided by an aperture 36 defined through the linkage 32, a corresponding aperture 38 defined through the tongue 10, and a coupling pin 40 extending through the apertures 36 and 38. If the tongue 10 is constructed of rectangular tubing, it is preferable to have an aperture 38 on each side of the tubing so that the pin 40 can be extended through both sides of the tongue 10 such that the two end of the pin 40 are external to the brake actuator assembly 24 and the linkage 32, thereby providing for greater strength and stability.

The pin 40 is held in a fixed position and is prevented from sliding out of the channel formed by the alignment of the apertures 36 and 38 in the linkage 32 and the tongue 10 respectively by an attachment 42. Alternatively, the pin 40 may be held in place by an enclosure such as a battery box surrounding both ends of the pin 40 to prevent it from sliding out. It is to be understood by those skilled in the art that the detachable coupling 35 may alternatively be provided by a ball hitch, a latch, a pawl and rack or a like coupling disposed external to the second guide 22 and the stationary portion 30 of the brake assembly 24.

Referring now to FIG. 4, there is illustrated a second preferred embodiment of the present invention. This embodiment is similar to the first preferred embodiment, except the first guide 20 and second guide 22 are replaced by a single guide tube 50 having a first portion 52 and second portion 54. The first portion 52 supports the first intermediate portion 13 of the tongue 10 and the second portion 54 supports the second end 14 of the tongue 10.

In operation, the tongue 10 is inserted through the guides 20 and 22 far enough to align its aperture 38 with the aperture 36 in the linkage 32, and the pin 40 is inserted there. It is preferable to have the aperture 38 extend completely through tongue 10 so that the pin 40 will be securely positioned to attach the tongue 10 to the trailer frame 16 through the linkage 32 of the brake actuator assembly 24. With the pin 40 inserted through the linkage 32 and the tongue 10, the hitch 18 at the first end 12 of the tongue 10 can be attached to the towing vehicle for towing.

To remove the trailer tongue 10, the pin 40 is removed from the linkage 32 and the tongue 10. After the pin 40 is removed, the tongue 10 is removed from the trailer frame 16 by sliding it out through guides 20 and 22. In this manner, the tongue 10 can be removed completely from the trailer frame 16 without disconnecting any of the hydraulic lines for the brake system.

An advantage of the present invention is the ability to remove the trailer tongue 10 for safety, theft prevention, or shipping purposes, without disconnecting the hydraulic system or any of its components. Ordinarily, removal of the tongue 10 necessitates removal of the master cylinder assembly 30 and then the hydraulic system has to be disconnected and reconnected, therefore the system has to be bled and checked to make sure that no air has entered the hydraulic lines 34. It is known to those skilled in the art to provide hydraulic lines 34 with quick connect couplings. These couplings prevent fluid from exiting the system, but there still exists the possibility that air may enter the system. Accordingly, for safety the hydraulic lines 34 have to be bled after each time that they are disconnected and reconnected. Otherwise, there is a risk of air entering the hydraulic system that can lead to "mushy" brakes or even to a total brake failure. The present invention eliminates the requirement of disconnecting the hydraulic lines 34 to remove the trailer tongue 10.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A removable trailer tongue apparatus, comprising:
   a) at least one trailer tongue;
   b) at least one first guide and at least one second guide, the trailer tongue telescopically engaging both the first and second guides;
   c) at least one brake actuator assembly having a stationary portion and a movable linkage, the stationary portion fixedly attached to the second guide, the movable linkage slidingly engaging the stationary portion; and
   d) at least one coupling detachably connecting the trailer tongue and the movable linkage, the coupling disposed external to the second guide and the stationary portion of the brake actuator assembly.

2. The removable trailer tongue of claim 1, wherein the tongue is constructed of rectangular tubing, and the first and second guides are constructed of rectangular tubing and are capable of slidingly receiving the tongue therethrough.

3. The removable trailer tongue of claim 1, wherein the brake actuator assembly comprises a hydraulic surge brake and the stationary portion thereof comprises a master cylinder assembly.

4. The removable trailer tongue of claim 1, wherein the detachable coupling is selected from the group consisting of a pin, a latch, a bolt, a ball hitch, and a pawl or a rack.

5. A removable trailer tongue apparatus, comprising:
a) at least one trailer tongue;
b) at least one first guide and at least one second guide, the trailer tongue telescopically engaging both the first and second guides;
c) at least one brake actuator assembly having a stationary portion and a movable linkage, the stationary portion fixedly attached to the second guide, the movable linkage slidingly engaging the stationary portion; and
d) at least one coupling pin detachably connecting the trailer tongue and the movable linkage, the coupling pin having two ends external to the brake actuator assembly and the tailer tongue.

6. The removable trailer tongue of claim 5, wherein the tongue is constructed of rectangular tubing, and the first and second guides are constructed of rectangular tubing and are capable of slidingly receiving the tongue therethrough.

7. The removable trailer tongue of claim 5, wherein the brake actuator assembly comprises a hydraulic surge brake and the stationary portion thereof comprises a master cylinder assembly.

8. A removable trailer tongue apparatus, comprising:
a) at least one trailer tongue;
b) at least one guide tube, the trailer tongue telescopically engaging the guide tube;
c) at least one brake actuator assembly having a stationary portion and a movable linkage, the stationary portion fixedly attached to the guide tube, the movable linkage slidingly engaging the stationary portion; and
d) at least one coupling pin detachably connecting the trailer tongue and the movable linkage, the coupling pin having two ends external to the brake actuator assembly and the trailer tongue.

9. The removable trailer tongue of claim 8, wherein the tongue is constructed of rectangular tubing, and the guide tube is constructed of rectangular tubing and is capable of slidingly receiving the tongue therethrough.

10. The removable trailer tongue of claim 8, wherein the brake actuator assembly comprises a hydraulic surge brake and the stationary portion thereof comprises a master cylinder assembly.

11. A trailer, comprising:
a) a trailer frame;
b) at least one trailer tongue;
c) at least one first guide and at least one second guide, the first and second guides attached to the trailer frame, the trailer tongue telescopically engaging both the first and second guides;
d) at least one brake actuator assembly having a stationary portion and a movable linkage, the stationary portion fixedly attached to the trailer frame, the movable linkage slidingly engaging the stationary portion; and
e) at least one coupling detachably connecting the trailer tongue and the movable linkage, the coupling disposed external to the second guide and the stationary portion of the brake actuator assembly.

12. The removable trailer tongue of claim 11, wherein the tongue is constructed of rectangular tubing, and the guide tube is constructed of rectangular tubing and is capable of slidingly receiving the tongue therethrough.

13. The removable trailer tongue of claim 11, wherein the brake actuator assembly comprises a hydraulic surge brake and the stationary portion thereof comprises a master cylinder assembly.

14. The removable trailer tongue of claim 11, wherein the detachable coupling is selected from the group consisting of a pin, a latch, a bolt, a ball hitch, or a pawl or a rack.

15. The removable trailer tongue of claim 11, wherein the trailer frame comprises a first cross member and a second cross member, the first guide attached to the first cross member and the second guide attached to the second cross member.

16. The removable trailer tongue of claim 15, wherein the first cross member is subjacent to the second cross member.

* * * * *